(12) United States Patent
Zhou (10) Patent No.: US 11,630,868 B2
(45) Date of Patent: Apr. 18, 2023

(54) TRACKING INTEGRATION DEVICE, SYSTEM AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Shang-Qing Zhou, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 673 days.

(21) Appl. No.: 16/398,773

(22) Filed: Apr. 30, 2019

(65) Prior Publication Data
US 2020/0311166 A1    Oct. 1, 2020

(30) Foreign Application Priority Data
Mar. 28, 2019    (CN) .......................... 201910242358.8

(51) Int. Cl.
G06F 16/90    (2019.01)
G06F 16/909    (2019.01)
H04L 67/14    (2022.01)
H04L 67/10    (2022.01)

(52) U.S. Cl.
CPC ............ *G06F 16/909* (2019.01); *H04L 67/14* (2013.01)

(58) Field of Classification Search
CPC ..................................................... G06F 16/909
See application file for complete search history.

(56) References Cited

U.S. PATENT DOCUMENTS

| 2011/0282864 | A1 | 11/2011 | Collins et al. | |
| 2018/0357292 | A1* | 12/2018 | Rai | G06N 20/00 |
| 2019/0050766 | A1* | 2/2019 | Barday | G06Q 10/067 |

FOREIGN PATENT DOCUMENTS

| CN | 101488180 | | 7/2009 |
| CN | 103368971 | A | 10/2013 |
| CN | 106294781 | A | 1/2017 |

* cited by examiner

Primary Examiner — Kristopher Andersen
(74) Attorney, Agent, or Firm — ScienBiziP, P.C.

(57) ABSTRACT

A tracking integration method includes acquiring at least one generalized object, extracting position characteristics of the generalized object and establishing the extracted position characteristics as a standard position model, receiving and storing tracking information of the at least one generalized object to complete integration of the tracking information, and querying and displaying the tracking information of the generalized object. The generalized object includes one or more of a person, an item, a digital asset, and a virtual object.

8 Claims, 5 Drawing Sheets

TRACKING INTEGRATION DEVICE, SYSTEM AND METHOD

FIELD

The subject matter herein generally relates to position tracking management, and more particularly to a tracking integration system and a tracking integration method.

BACKGROUND

Currently there are many different position tracking management solutions or platforms for different tracking purposes, such as map service platforms, logistics tracking management platforms, document tracking management platforms, currency tracking management platforms, and the like. Thus, corresponding management systems/technologies/platforms are different according to the different objects to be tracked, and different systems/platforms need to be deployed, which leads to poor compatibility of various systems which cannot be integrated for convenient management.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
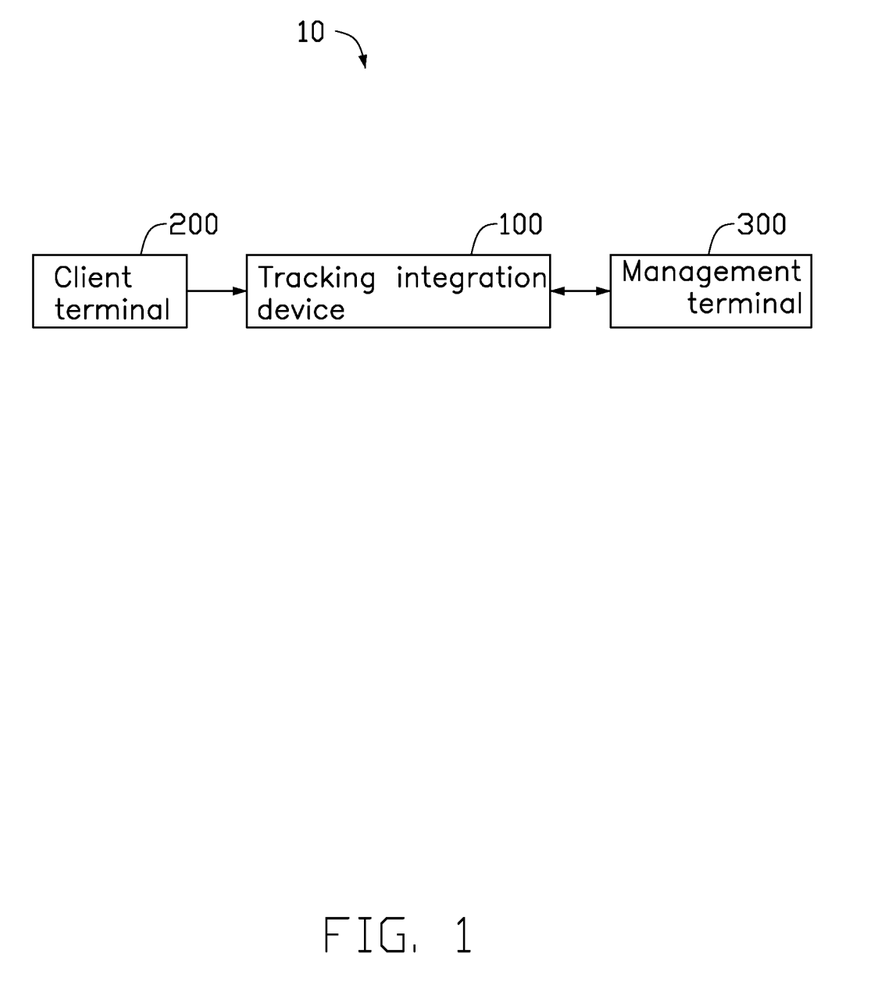
FIG. 1 is a block diagram of an embodiment of a tracking integration system.

FIG. 1 shows an embodiment of a tracking integration system 10 including a tracking integration device 100, at least one client terminal 200, and at least one management terminal 300. The client terminal 200 and the management terminal 300 establish communication with the tracking integration device 100.

Specifically, the tracking integration device 100 is configured to integrate position tracking information of a plurality of generalized objects, so that the position tracking information of different generalized objects are integrated in a unified data platform, thereby reducing deployment of multiple data platforms.

The generalized objects may include, but are not limited to, people, items, digital assets, and virtual objects. Position characteristics of the generalized objects may include, but are not limited to, absolute coordinates, relative coordinates, and owners.

The client terminal 200 is configured to input a name and position characteristics of a generalized object. The client terminal 200 is a mobile terminal such as, but not limited to, a mobile phone, a tablet, or other handheld and wearable terminals. Specifically, the client terminal 200 includes a person tracking client terminal, a device tracking client terminal, and a form tracking client terminal.

The person tracking client terminal is configured to acquire position tracking information of a target person. The position tracking information of the target person is defined as an absolute coordinate, such as a latitude and longitude of the target person. The person tracking client terminal acquires the latitude and longitude of the target person through a client terminal software running on a portable device (such as a mobile phone, tablet, or the like) of the target person. The position tracking information of the target person is input through an input interface of the person tracking client terminal and uploaded to the tracking integration device 100.

The device tracking client terminal is installed on a target device that needs to be tracked and acquires position tracking information of the target device. The position tracking information of the target device is defined as a relative coordinate, such as a latitude and longitude of the target device, to determine a position of the target device relative to a warehouse or other management center. The device tracking client terminal acquires the latitude and longitude of the target device from a location acquisition module (such as a satellite positioning module or an indoor positioning module) on the target device. The position tracking information of the target device is input through an input interface of the device tracking client terminal and uploaded to the tracking integration device 100.

The form tracking client terminal may be, but is not limited to, a mobile phone, a tablet, or other mobile terminal, and may also be, but is not limited to, a desktop computer or other fixed terminal. The form tracking client terminal is configured to track position tracking information of a target form, such as a sign-off form. Position tracking information of the target form is defined as a sign-off status of the target form. The position tracking information of the target form is input through an input interface of the form tracking client terminal and uploaded to the tracking integration device 100.

The management terminal 300 may be, but is not limited to, a mobile phone, a tablet, or other mobile terminal, and may also be, but is not limited to, a desktop or other fixed terminal. The management terminal 300 is configured to acquire relevant information from the tracking integration device 100 according to a queried generalized object, such as a person, a device, or a form, and combine query conditions such as time units and an object range to generate a corresponding visualized tracking map.

Figure 2:
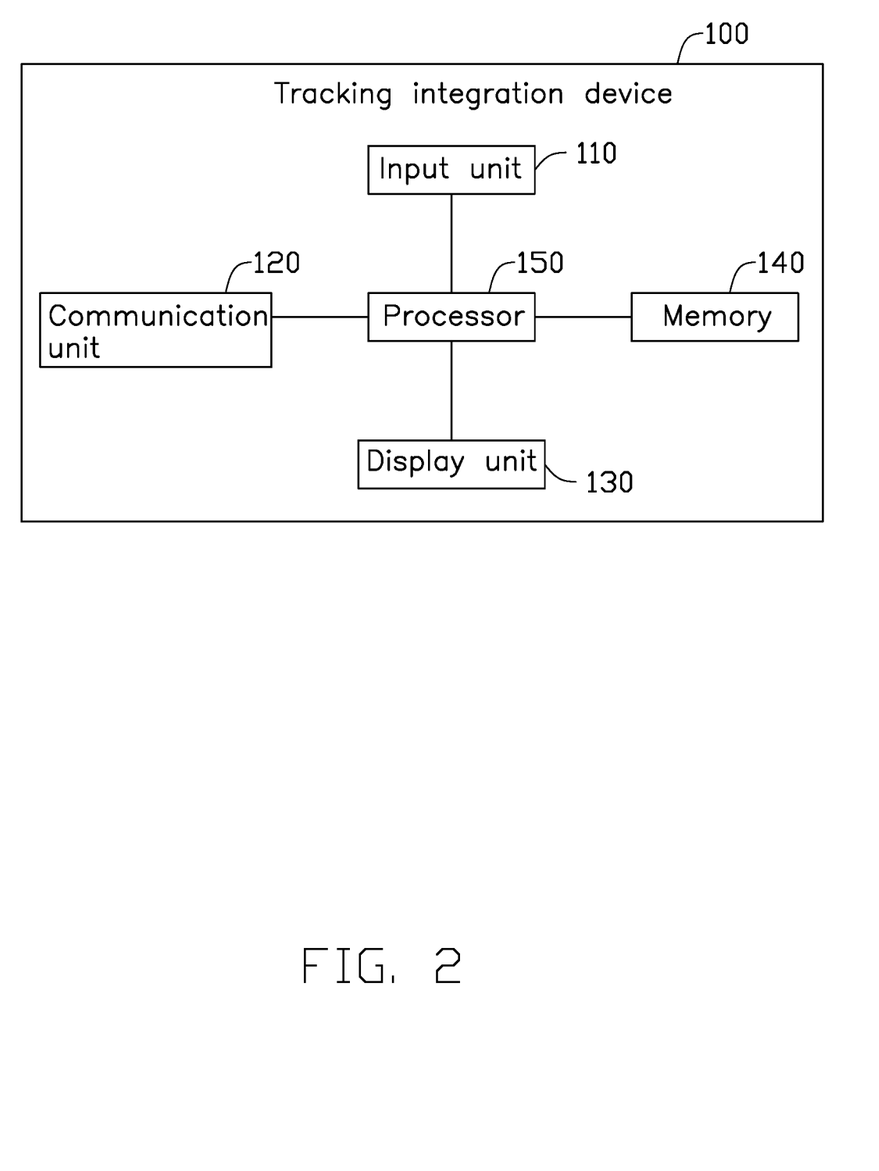
FIG. 2 is a block diagram of a tracking integration device of the tracking integration system in FIG. 1.

Referring to FIG. 2, the tracking integration device 100 includes an input unit 110, a communication unit 120, a display unit 130, a memory 140, and a processor 150.

The input unit 110, the communication unit 120, the display unit 130, and the memory 140 are electrically coupled to the processor 150.

The input unit 110 is configured to input various information and control instructions, such as a control instruction and related information for establishing a standard position model and a standard object model. The input unit 110 may be, but is not limited to, a remote control, a mouse, a voice input device, a touch screen, or the like.

The communication unit 120 is configured to establish communication with the at least one client terminal 200 and the at least one management terminal 300. The tracking integration device 100 establishes communication with the at least one client terminal 200 to receive position information of a generalized object obtained from the client terminal 200. The tracking integration device 100 establishes communication with the management terminal 300 to send position information of the generalized object stored in the tracking integration device 100.

The communication unit 120 can be a wireless network or a wired network, including, but not limited to, the Internet, a local area network, WIFI, BLUETOOTH, a cellular mobile network, a satellite network, or the like. The display unit 130 is for displaying the generalized object name stored by the tracking integration device 100, the position information of the corresponding generalized object, and the like. In one embodiment, the display unit 130 may be, but is not limited to, a display device such as a touch display screen or a liquid crystal display.

The memory 140 is configured to store various data of the tracking integration device 100, such as a standard object model of a generalized object, a standard position model, and a control instruction of position information of a generalized object. The memory 140 may include, but is not limited to, a Read-Only Memory (ROM), a Random Access Memory (RAM), a Programmable Read-Only Memory (PROM), an Erasable Programmable Read-Only Memory (EPROM), a One-Time Programmable Read-Only Memory (OTPROM), an Electrically Erasable Programmable Read-Only Memory (EEPROM), a Compact Disc Read-Only Memory (CD-ROM), or other optical disc storage, disk storage, tape storage, or computer readable format.

In one embodiment, the memory 140 stores a standard object model and a standard position model of a generalized object. The standard object model and the standard position model are represented by a data structure.

The processor 150 can be a central processing unit (CPU), a microprocessor, a digital processing chip, or any processing chip capable of performing data processing functions.

Figure 3:
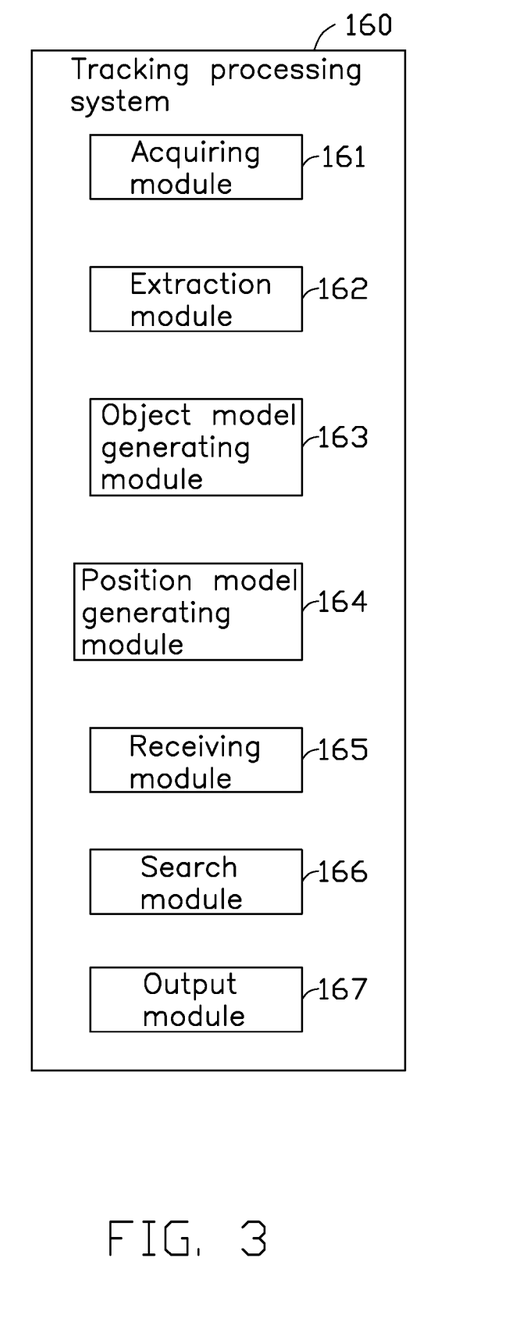
FIG. 3 is a block diagram of an embodiment of a tracking processing system.

Referring to FIG. 3, the tracking integration device 100 implements a tracking processing system 160. The tracking processing system 160 includes one or more function modules, which are a collection of instructions stored in the memory 140 and executed by the processor 150. The plurality of function modules include an acquiring module 161, an extraction module 162, an object model generating module 163, a position model generating module 164, a receiving module 165, a search module 166, and an output module 167.

The acquiring module 161 is configured to acquire one or more generalized objects and generate a corresponding structure. The generalized object may include people, objects, digital assets, and virtual objects. Specific generalized objects are acquired to generate the structure to facilitate establishment of subsequent standard object models and standard position models.

The extraction module 162 is configured to extract position characteristics corresponding to the generalized object. The position characteristics of the generalized object include one or more of absolute coordinates, relative coordinates, and an owner. Specifically, if the generalized object is a person, the corresponding position information is an absolute coordinate, such as a real-time position where the target person is located. If the generalized object is an object, the corresponding position information is a relative coordinate, such as a position relative to a warehouse, a destination, or a management center. If the generalized object is a digital asset or a virtual object, such as a form or virtual currency, the corresponding position information is the owner of the digital asset or virtual object.

The object model generating module 163 is configured to establish a standard object model. The standard object model is built with data structures, the names of generalized objects are assembled into structures, characteristics of the generalized objects are set within the structures, and the standard object model is established by collection of the structures.

The position model generating module 164 is configured to establish a standard position model. The standard position model is also built with data structures, the positional attributes of the generalized objects are assembled into structures and set within the structures, and the standard position model is established by collection of the structures.

The receiving module 165 is configured to receive position tracking information of the generalized object provided by the client terminal 200 to complete integration of the tracking information. If the generalized object is a person, the position tracking information of the person is received, and the position tracking information is stored in the standard position model for future reference. If the generalized object is an item, such as a device, the position tracking information of the device is received. If the generalized object is a form, the position tracking information of the form is received.

The search module 166 is configured to query position tracking information of the corresponding generalized object according to a query instruction of the management terminal 300. The query instruction includes a generalized object name and a query condition. The generalized object may be person tracking, device tracking, or form tracking, and the query condition may include a time unit and an object range.

The search module 166 is further configured to query whether a new generalized object exists in the established standard object model, and if so, extract the position information of the generalized object and establish the standard position model. If the new generalized object does not exist in the established standard object model, assemble the new generalized object and establish the standard object model.

The output module 167 is configured to query the tracking information of the generalized object in the tracking integration device 100 according to the query instruction of the management terminal 300, and output the tracking information to the management terminal 300.

Figure 4:
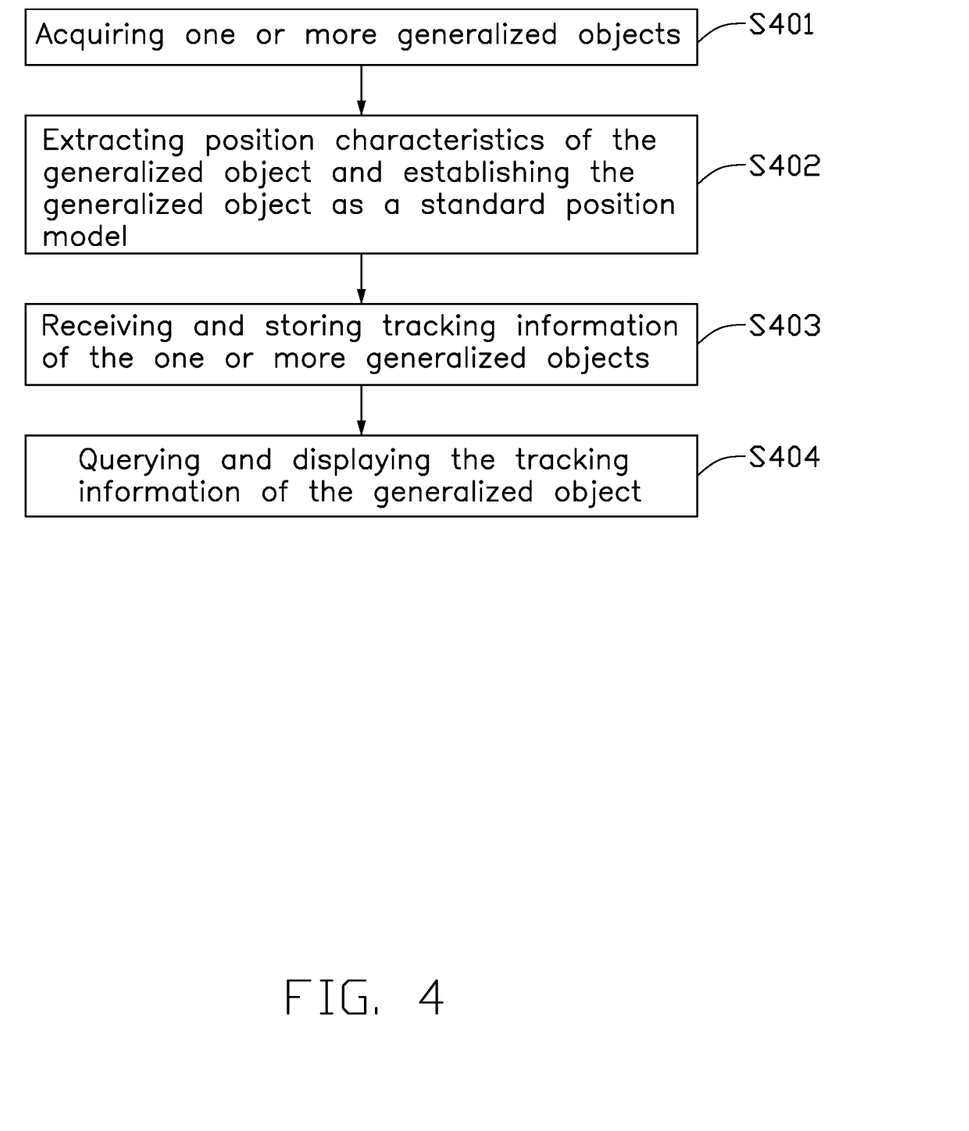
FIG. 4 is a flowchart of an embodiment of a tracking information integration method.

FIG. 4 shows a flowchart of a tracking information integration method. The method is provided by way of embodiment, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S401, one or more generalized objects is acquired.

Specifically, and according to actual needs, one or more generalized objects is acquired and a corresponding structure is generated. The structure includes a name and position information of the generalized object. The generalized object may include one or more of a person, an item, a digital asset, and a virtual object. The item may be a device, the digital asset may be a form, and the virtual object may be a virtual currency.

At block S402, position characteristics of the generalized object are extracted and established as a standard position model.

Specifically, for the above generalized object, the position characteristics are extracted correspondingly. If the generalized object is a person, the corresponding position characteristic is an absolute coordinate, such as a real-time position of the person. If the generalized object is an item, the corresponding position characteristic is a relative coordinate, such as a position relative to a warehouse, destination, or management center. If the generalized object is a digital asset or a virtual object, such as a form or virtual currency, the corresponding position characteristic is an owner of the digital asset or virtual object.

A standard position model is established based on the position information of the generalized object as described above. The processor 150 establishes the standard position model based on control instructions for establishing the standard position model stored in the memory 140. The standard position model also uses the data structure to establish the position characteristics of the generalized objects into a structure. The position characteristics of the generalized objects are set in the structure, and the generalized standard position model is established through the collection of structures.

At block S403, tracking information of the one or more generalized objects is received and stored.

Specifically, the client terminal 200 acquires position tracking information of the generalized object and sends the position tracking information to the tracking integration device 100. The tracking integration device 100 receives the position tracking information of the generalized object and stores the position tracking information in the standard position model to complete integration of the tracking information for further review.

The client terminal 200 includes a person tracking client terminal, a device tracking client terminal, and a form tracking client terminal. A manner of obtaining the position tracking information of the generalized object is detailed above and will not be described here.

At block S404, the tracking information of the generalized object is queried and displayed.

Specifically, the management terminal 300 confirms a query instruction and outputs a query command to the tracking integration device 100. The query instruction includes a generalized object name and a query condition. The generalized object may be a person, a device, or a form, and the query condition may include a time unit and an object range. Furthermore, a position tracking query is performed on the generalized object of the query instruction, and the query result is output to the management terminal 300. The management terminal 300 displays the position tracking information of the queried generalized object.

In some embodiments, the tracking information of the queried generalized object is simultaneously displayed on the tracking integration device 100.

Figure 5:
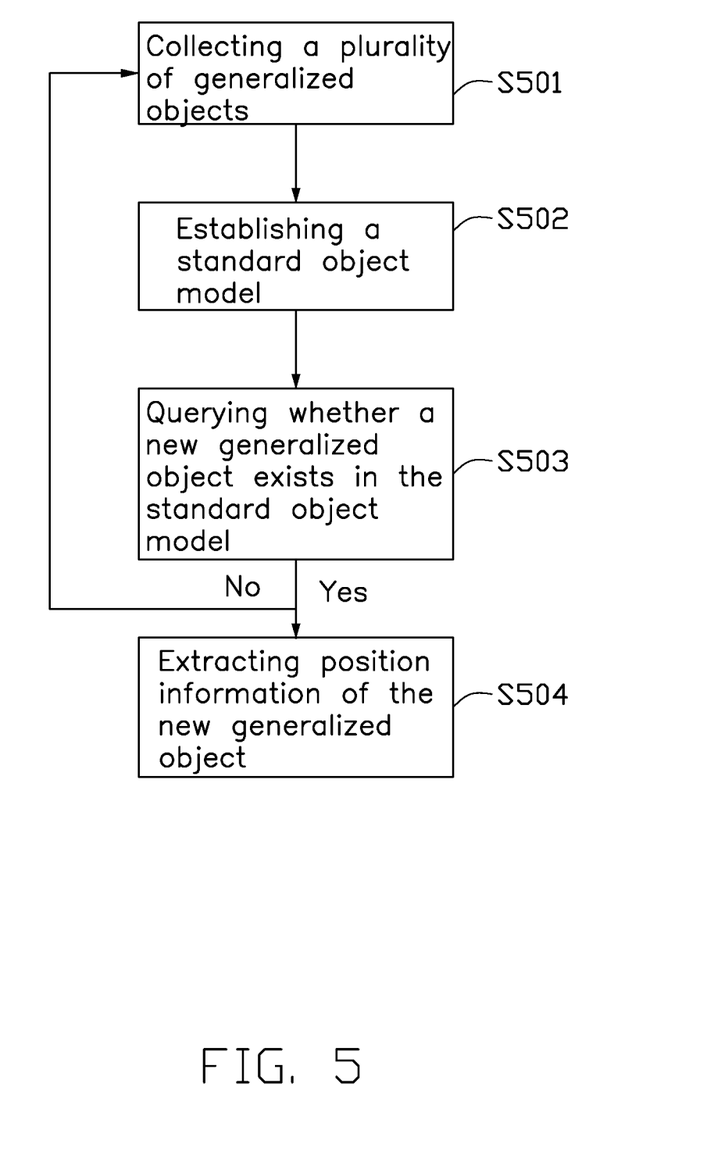
FIG. 5 is a flowchart of an embodiment of a method of establishing a standard object model for integrating tracking information

FIG. 5 shows a flowchart of a method of establishing a standard object model for integrating tracking information. The method is provided by way of embodiment, as there are a variety of ways to carry out the method. The method described below can be carried out using the configurations illustrated in FIGS. 1-3, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure.

At block S501, a plurality of generalized objects are collected.

As described above, according to actual needs, the generalized objects may include one or more of a person, an item, a digital asset, and a virtual object. The item may be a device, the digital asset may be a form, and the virtual object may be a virtual currency.

At block S502, a standard object model is established.

Specifically, the processor 150 establishes the standard object model based on control instructions for establishing the standard object model stored in the memory 140. The standard object model is established with data structures. The names of generalized objects are assembled into structures, feature information of the generalized objects is set within the structures, and the standard object model is established by collection of the structures.

At block S503, whether a new generalized object exists in the standard object model is queried.

Specifically, if a new generalized object needs to be added to the standard object model, whether the new generalized object already exists in the standard object model is first queried. If the new generalized object already exists in the standard object model, block S504 is implemented. If the new generalized object does not exist in the standard object model, block S501 is repeated.

At block S504, position information of the new generalized object is extracted.

If the new generalized object already exists in the standard object model, the position information of the new generalized object is extracted for the establishment of the subsequent standard object model as described in block S402.

If the new generalized object does not exist in the standard object model, the new generalized object is assembled into the original set of generalized objects.

The tracking integration method and device provided by the present disclosure utilizes the tracking integration device 100 to be compatible with different generalized objects and integrates and manages position information of different generalized objects to visually present the position of the generalized objects. By abstracting the position information of the generalized objects, position tracking can be applied to different generalized objects, and a unified platform is used to simplify the management of each generalized object.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A tracking integration method comprising:
acquiring at least one generalized object, the at least one generalized object comprising one or more of a person, an item, a digital asset, and a virtual object;
extracting position characteristics of the at least one generalized object and establishing the extracted position characteristics as a standard position model, the position characteristics of the at least one generalized object comprising absolute coordinates, relative coordinates, and owners;
receiving and storing tracking information of the at least one generalized object to complete integration of the tracking information, the tracking information comprising position tracking information of a target person, a target device, and a target form, the position tracking information of the target person defined as the absolute coordinates, the position tracking information of the target device defined as the relative coordinates, and the position tracking information of the target form defined as a sign-off status of the target form;
querying and displaying the tracking information of the at least one generalized object;
establishing a standard object model;
querying whether a new generalized object exists in the established standard object model;
extracting position information of the new generalized object if the new generalized object exists in the established standard object model; and
collecting the new generalized object and updating the standard object model if the new generalized object does not exist in the established standard object model.

2. The tracking integration method of claim 1, wherein:
the standard object model and the standard position model are represented by data structures.

3. A tracking integration device comprising:
an input unit configured to input information and control instructions for establishing a standard position model and a standard object model;
a communication unit configured to establish communication with at least one client terminal and at least one management terminal;
a display unit configured to display tracking information;
a processor; and
a memory configured to store a plurality of instructions, which when executed by the processor, cause the processor to:
acquire at least one generalized object, the at least one generalized object comprising one or more of a person, an item, a digital asset, and a virtual object;
extract position characteristics of the at least one generalized object and establish the extracted position characteristics as a standard position model, the position characteristics of the at least one generalized object comprising absolute coordinates, relative coordinates, and owners;
receive and store tracking information of the at least one generalized object through the communication unit to complete integration of the tracking information, the tracking information comprising position tracking information of a target person, a target device, and a target form, the position tracking information of the target person defined as the absolute coordinates, the position tracking information of the target device defined as the relative coordinates, and the position tracking information of the target form defined as a sign-off status of the target form;
query and display the tracking information of the at least one generalized object by the input unit and the display unit;
establish a standard object model;
query whether a new generalized object exists in the established standard object model;
extract position information of the new generalized object if the new generalized object exists in the established standard object model; and
collect the new generalized object and update the standard object model if the new generalized object does not exist in the established standard object model.

4. The tracking integration device of claim 3, wherein:
the memory further stores the position characteristics of the at least one generalized object.

5. The tracking integration device of claim 3, wherein:
the standard object model and the standard position model are represented by data structures.

6. A tracking integration system comprising:
a tracking integration device;
at least one client terminal in communication with the tracking integration device and configured to input position tracking information of a generalized object to the tracking integration device; and
at least one management terminal in communication with the tracking integration device and configured to obtain the position tracking information stored in the tracking integration device; wherein:
the tracking integration device comprises a processor, a memory configured to store a plurality of instructions, and an input unit configured to input various information and control instructions for establishing a standard position model and a standard object model;
the tracking integration device executes the instructions by the processor to:
acquire at least one generalized object, the at least one generalized object comprising one or more of a person, an item, a digital asset, and a virtual object;
extract position characteristics of the at least one generalized object and establish the extracted position characteristics as a standard position model, the position characteristics of the at least one generalized object comprising absolute coordinates, relative coordinates, and owners;

receive and store tracking information of the at least one generalized object through a communication unit to complete integration of the tracking information, the tracking information comprising position tracking information of a target person, a target device, and a target form, the position tracking information of the target person defined as the absolute coordinates, the position tracking information of the target device defined as the relative coordinates, and the position tracking information of the target form defined as a sign-off status of the target form;

query and display the tracking information of the at least one generalized object by the input unit and a display unit;

establish a standard object model;

query whether a new generalized object exists in the established standard object model;

extract position information of the new generalized object if the new generalized object exists in the established standard object model;

collect the new generalized object and update the standard object model if the new generalized object does not exist in the established standard object model.

7. The tracking integration system of claim 6, wherein:
the tracking integration device further stores position characteristics of the at least one generalized object.

8. The tracking integration system of claim 6, wherein:
the standard object model and the standard position model are represented by data structures.

* * * * *